Dec. 2, 1941.   J. R. GIER, JR   2,264,693
APPARATUS FOR THE DISSOCIATION OF AMMONIA
Filed Sept. 15, 1939
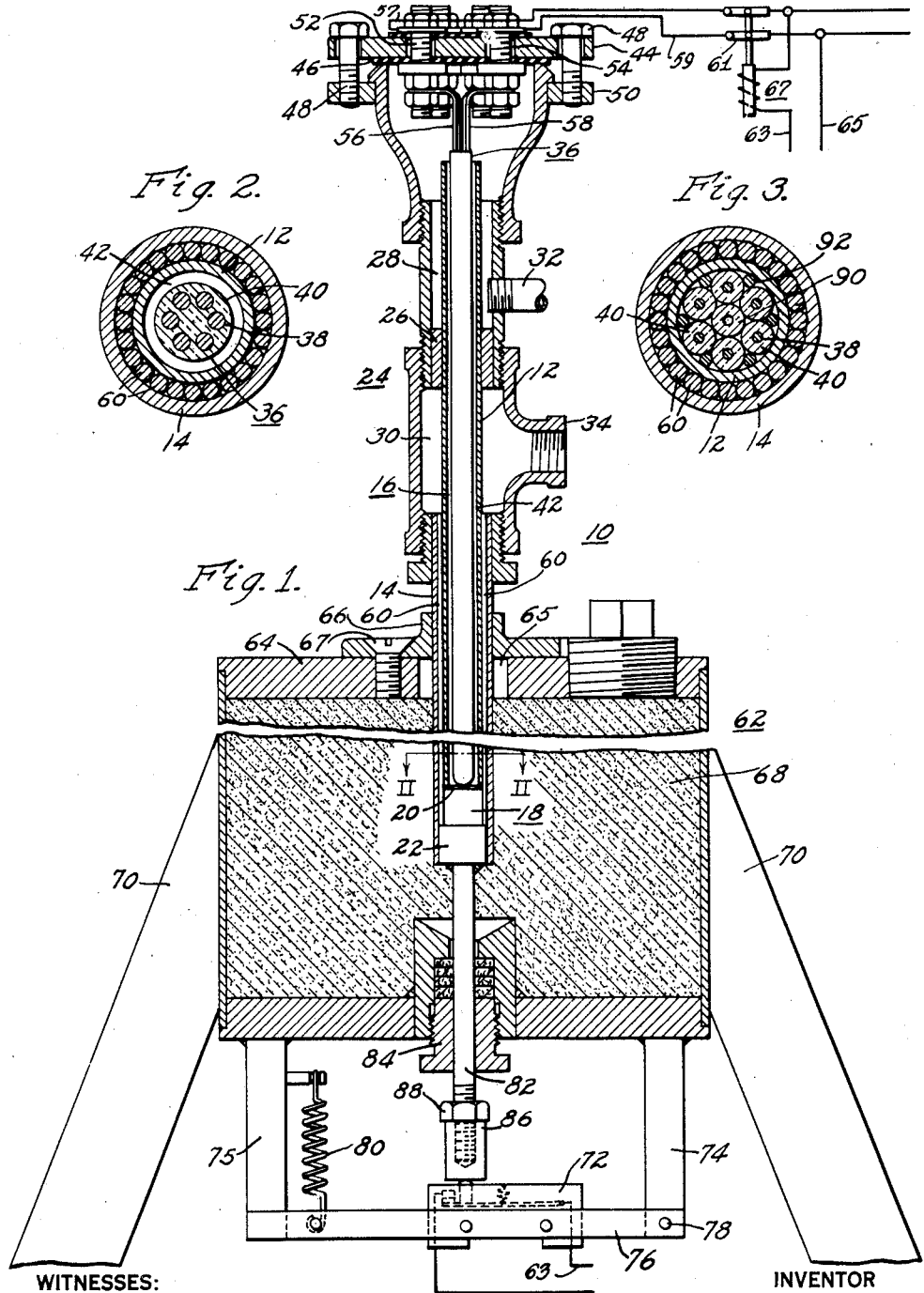

Patented Dec. 2, 1941

2,264,693

UNITED STATES PATENT OFFICE 2,264,693

APPARATUS FOR THE DISSOCIATION OF AMMONIA

John R. Gier, Jr., Wilkinsburg, Pa., assignor to Westinghouse Electric & Manufacturing Company, East Pittsburgh, Pa., a corporation of Pennsylvania Application September 15, 1939, Serial No. 295,059

5 Claims. (Cl. 23—288)

This invention relates to apparatus for the dissociation of ammonia.

Dissociated ammonia is employed in many industrial applications, and particularly as protective atmospheres in furnaces employed for the heat treatment of different types of ferrous alloys. Different types of apparatus have heretofore been employed in dissociating ammonia with more or less success, all of the known apparatus having disadvantages peculiar to the particular structure employed. Some of the most common disadvantages found with the dissociators employed prior to this invention are the size of the apparatus used, the initial and maintenance cost, and the inefficiency of the apparatus in operation.

An object of this invention is to provide apparatus for the dissociation of ammonia which is simple in construction, being relatively compact and economical and efficient in operation.

A further object of this invention is to provide apparatus for the dissociation of ammonia whereby a high velocity turbulent flow of ammonia is secured in the apparatus to effect a substantially complete dissociation of the ammonia which is simple in construction, being relatively compact, and which is economical and efficient in operation.

A further object of this invention is to provide apparatus for the dissociation of ammonia whereby a high velocity turbulent flow of ammonia is secured in the apparatus to effect a substantially complete dissociation of the ammonia.

A more specific object of this invention is to provide apparatus for the dissociation of ammonia in which a source of heat is so disposed in the path of the flow of ammonia as to efficiently impart heat thereto while providing for a high velocity turbulent flow of the ammonia within the apparatus.

Another object of this invention is to provide apparatus for the dissociation of ammonia in which metal capable of functioning as a catalyst and an associated heating unit are so disposed in a plurality of elongated and concentrically spaced tubular chambers as to efficiently impart heat thereto and to provide for a high velocity turbulent flow of ammonia therethrough for effecting a substantially complete dissociation of the ammonia.

Another object of this invention is to provide apparatus for the dissociation of ammonia having a dissociation chamber and control equipment associated therewith for regulating the maximum temperature developed within the chamber.

Other objects of this invention will become apparent from the following description when taken in conjunction with the accompanying drawing, in which:

Figure 1 is an elevational view mainly in section of the dissociator apparatus embodying the teachings of this invention;

Fig. 2 is a view in section of a part of the apparatus of Fig. 1 taken along the line II—II thereof; and Fig. 3 is a view in section similar to Fig. 2 of another embodiment of the teachings of this invention.

Referring to the drawing, and Fig. 1 in particular, this invention is illustrated by reference to a dissociator apparatus 10 comprising a plurality of elements so associated and assembled as to give a compact structure which will function to efficiently and economically dissociate ammonia. In the particular dissociator apparatus 10 illustrated, a dissociation chamber is formed of a plurality of elongated metallic tubular members 12 and 14 disposed concentrically and in spaced relation to each other to form inner and outer chambers 16 and 18, respectively. The tubular member 12, referred to hereinafter as the inner tubular member, is somewhat longer than the outer tubular member 14 and, when disposed within the outer member 14, extends or projects upwardly therefrom.

In order to provide a support at the lower end of the inner tubular member 12, the reason for which will be explained hereinafter, a perforated strip 20 or the like is disposed across its lower end and is suitably attached thereto as by means of welding or the like. This strip 20 is so perforated, or where a plurality of strips are used they are so spaced, as to permit the passage of ammonia gas from the inner chamber 16 directly to the outer chamber 18 formed by the inner and outer tubular members 12 and 14, respectively, as will be explained more fully hereinafter. The lower end of the tubular member 14 is effectively closed as by means of the block 22 of suitable metal so disposed and retained therein as to prevent the escape of ammonia gas from the chamber 18.

In order to provide for the ingress of the ammonia gas which is to be dissociated and the egress of the dissociated ammonia, an outer tubular housing 24 is disposed about the upper end of the outer tubular member 14 and projects upwardly therefrom to enclose the end of the inner tubular member 12. A barrier 26 is disposed within the outer tubular housing 24 to provide a seal between the housing 24 and the inner tubular member 12 whereby a plurality of chambers 28 and 30 are formed within the housing 24 sealed from each other. Suitable inlets and outlets 32 and 34 are disposed in the housing 24 above and below the barrier 26 to provide for the ingress and egress of the gas to and from the chambers 28 and 30, respectively.

In order to provide a source of heat to aid in effecting the dissociation of ammonia gas as it flows through the inner and outer dissociation chambers, an elongated heating unit 36 is disposed within the inner chamber 16 for heating the ammonia as it passes therethrough. Referring to Fig. 2, this heating element 36 is illustrated as comprising a plurality of resistance units 38 embedded in an insulating material 40, such as porcelain or the like. The covering of porcelain or the like is employed in order to protect the resistance units from exposure to the ammonia gas, whereby a longer life of the heating unit is obtained. As illustrated, the heating unit 36 is of such size and is so positioned within the inner chamber 12 as to leave only a very narrow space 42 between the inner side walls of the tubular member 12 and the insulator 40. Such small paths are desirable, as will be explained more fully hereinafter.

In order to close the end of the housing 24 to prevent the escape of ammonia gas therefrom, a suitable cover plate 44 of a size sufficient to cover the end of the housing 24 is disposed to seat thereon. Where desired, a suitable gasket material 46 may be employed between the housing 24 and the cover plate 44 for obtaining a sealed structure. The cover plate 44 may be held in position over the end of the housing 24 by any suitable means or, as illustrated, by means of the bolts 48 disposed in spaced relation about the cover plate 44 for engaging with suitable flanges or flange structure 50 positioned about the end of the housing 24. In practice, the cover plate 44 also carries conductors 52 and 54 projecting therethrough and suitably insulated therefrom to which the leads 56 and 58 of the heating unit 36 are electrically connected. Conductors 57 and 59 from a suitable source of power, not shown, may be connected through a switch 61 to the conductors 52 and 54 external of the cover plate 44 of the housing to energize the heating elements 38 of the heating unit.

In practice, the leads 56 and 58 are somewhat flexible in order that the thermal expansion of the heater unit will not damage them and to permit slight movements of the plate 44 in sealing the apparatus. As illustrated, the elongated heating unit 36 is of a length slightly longer than the inner tubular member 12, and is supported in position therein by the perforated strip 20 carried on the lower end of the inner tubular member 12. In practice, in case the heating unit 36 becomes damaged or burns out, it is very easy to replace the heating unit with a new one by simply removing the cover plate 44 and withdrawing the heating unit from the inner chamber 16. This removable unit facilitates repairs to the apparatus when necessary.

In order to provide for the efficient dissociation of the ammonia gas, metal capable of functioning as a catalyst is so disposed in the space between the inner and outer tubular members 12 and 14, respectively, that as the gas flows from the inner chamber 16 directly to the outer chamber 18, it must necessarily come in contact with the catalyst. As illustrated in Figs. 2 and 3, the catalyst in a preferred form comprises a plurality of nickel rods 60 so disposed adjacent each other in closely compact form as to leave only very small spaces between the individual catalyst members and the inner and outer tubular members 12 and 14. These nickel rods are easily positioned in assembling the apparatus and are maintained in position by seating on the block 22, which closes the lower end of the tubular member 14. With the catalyst disposed in this manner in the space between the inner and outer tubular members 12 and 14, it is apparent that the heat evolved from the heating unit 36 in the inner tubular member 12 not only heats the ammonia gas as it passes through the inner chamber 16, but is also so radiated from the tubular member 12 and so carried by the gas as it flows therethrough as to be efficiently delivered to the catalyst 60 in the space between the chambers.

In order to conserve the heat generated by the heating unit 36, a thermal insulating chamber 62 is disposed about the major portion of the assembled inner and outer tubular members 12 and 14. This insulating chamber is of a length sufficient to enclose the lower end of the outer tubular member 14, and is sufficiently rigid to support the weight of the assembled apparatus described hereinbefore. In order to maintain the assembled chambers in their thermally insulated operative position, a flange ring 66 is secured, as by welding, to the outer tubular member 14 and seats on the cover plate 64 of the chamber 62 when the assembled chambers are positioned to extend through the opening 65 in the cover into the chamber 62. The flange 66 is secured to the cover 64 by means of the flange screw 67, thereby securing the assembled tubular members 12 and 14 in the chamber 62 and giving a structure resistant to mechanical shock. Any suitable insulating material 68 may be employed within the insulating chamber 62 about the assembled chambers for preventing the loss of heat by radiation, such materials as Silocel or bauxite being found quite satisfactory. In order to support the assembled apparatus in a vertical position, any suitable support, such as the legs 70, is associated with the insulating chamber 62 and rigidly attached thereto.

As explained hereinbefore, the heat from the heating unit 36 flows to or is radiated to the chamber 18 formed by the outer tubular member 14. This heat will fluctuate in accordance with the energy supplied to the heating unit, and where metals such as Inconel or Nichrome are employed as the inner and outer tubular members 12 and 14 will cause or effect an expansion or contraction of the tubular members in accordance with the heat developed within the chambers.

In order to control the maximum amount of heat developed within the chambers to prevent damage to the heating unit or other parts of the assembled apparatus, a micro-switch 72, the details of which are shown in dotted line, is associated with the insulating chamber 62 and is electrically connected to the source of power by conductors 63 and 65 through the relay 67 which is disposed to operate the switch 61 to interrupt the flow of current to the heating unit under predetermined conditions. The micro-switch 72 is carried on a support formed by depending arms 74 and 75, which are suitably attached to the chamber 62 and a cross-arm 76, which is pivoted at one end to the leg 74, as at 78, and normally retained in a horizontal position by means of a spring 80 attached at the free end of the arm 76 to the leg 75.

In order to operate the micro-switch 72, a rod 82 is positioned through a suitable bushing structure 84 in the chamber 62, and is rigidly attached, as by welding, to the stop or block 22 so that any movement of the outer tubular member 14, as by reason of expansion or contraction thereof, is directly transmitted to the micro-switch 72. In order to permit adjustments for the operation of the micro-switch 72 at different elevated temperatures, the rod 82 carries an adjustable end cap 86 which can be moved with respect to the rod 82, as by screwing the nut 88 forming a part of the adjustable end cap. In practice, the end cap is so screwed onto the rod 82 that when a temperature is developed within the chamber 18 to cause the desired expansion of the tubular member 14, the end cap 86 contacts the operating mechanism of the micro-switch 72 to interrupt the energizing circuit of relay 67 whereby the switch 61 is actuated at its circuit interrupting position to effect an interruption of the flow of energy to the heating unit 36. When the temperature of the chamber 18 is sufficiently lowered to effect a contraction of the tubular member 14, the end cap 86 is withdrawn from the operating mechanism of the micro-switch 72 whereby the energizing circuit of relay 67 is closed and the switch 61 is actuated to its circuit closing position to permit the flow of energy to the heating unit 36.

As explained hereinbefore, the free end of the arm 76 which carries the micro-switch 72 is attached to the depending leg 75 by means of the spring 80. This manner of supporting the micro-switch 72 permits comparatively large movements of the arm 76 under pressure in a counter-clockwise direction about its pivot, and prevents damage to the micro-switch by reason of the expansion of the tubular member 14 before the end cap 86 is adjusted to the desired operating position on the rod 82.

In a particular embodiment of this invention as illustrated in Fig. 3, the heating unit 36 comprises a plurality of heating elements 38, each of which is carried in or covered with its own particular protective porcelain tube 40. As illustrated in Fig. 3, the space within the inner tubular member 12 is substantially filled by the covered elements 38, slight spaces only being left between the protective coatings of the elements. To further provide for the flow of ammonia gas through the space, in practice it has been found to be desirable to employ a protective tubular member 90 without a heating element in the center of the assembled elements. In addition to the plurality of heating elements disposed in the inner chamber 16, a plurality of catalysts 92 is also so disposed adjacent the protective coverings 40 that as the gas flows through the inner chamber and is heated, it is also in direct contact with the catalytic agents. Such positioning of the catalysts within the inner chamber insures a partial dissociation of the ammonia as it flows through the inner chamber.

In operation, the dissociator apparatus 10 is sealed and the heater unit 36 is so energized as to develop a desired temperature therein for evolving the heat necessary or desirable for dissociating ammonia. As the temperature of the heater unit approaches a desired temperature of between 1800° and 2000° F., ammonia gas is delivered to the apparatus from a suitable source of supply (not shown) through the inlet 32 and flows upwardly therefrom along the outer edge of the inner tubular member 12. As it flows along the inner tubular member 12, the ammonia gas is subjected to a preheat by reason of the heat radiated from the heater unit within the tubular member, and the preheated ammonia gas enters the inner tubular member and flows downwardly therethrough along the protected heater elements forming the heater unit 36.

As the gas flows downwardly along the heater unit, it is found that there is a partial dissociation of the ammonia gas into its nitrogen and hydrogen components. In flowing from the inner tubular member, the gas flows directly into the outer tubular member 14 where it reverses direction and flows upwardly in the space formed between the two tubular members in close physical contact with the catalysts 60. The catalysts 60 are effectively heated by reason of the heat radiated from the heater unit 36 in the inner tubular member 12 and by the heat carried by the partially dissociated ammonia as it flows from the inner chamber 16 to the outer chamber 18.

As described hereinbefore, the heater unit 36 and the catalysts 60 are so disposed within the inner and outer tubular members as to form very narrow and small paths within the chambers. It is found that the positioning of the heater unit and the catalysts in this manner aids in effecting a substantially complete dissociation of the ammonia, since the gas flowing through these small spaces has a very high velocity and comes into close physical contact with the catalysts. The flow velocity of the gas through the catalysts is of the type known as a turbulent flow as distinguished from a streamline flow. This turbulent flow is well above the critical flow velocity of the ammonia gas, the critical flow velocity being that velocity of fluid flow in a conduit below which the type of flow is streamline and above which it is turbulent. The streamline flow in a conduit is characterized by the orderly guiding of one layer of gas over another with slight intermingling, the velocity of the stream being greatest at the center and decreasing to almost zero at the wall surface. Such slow moving surface film impedes the action of the catalysts where the streamline flow predominates, whereas with a turbulent flow there is a continuous intermingling of the gas throughout the space, the velocity of the stream being substantially constant from the center of the stream to the wall surface.

The turbulent flow found in the apparatus of the present invention prevents the formation of stagnant gas films on the catalysts, and is effective in obtaining a physical contact of substantially all of the ammonia molecules with the catalysts to effect a substantially complete dissociation of the ammonia. The completely dissociated ammonia, obtained by reason of the turbulent flow of the ammonia gas through the chambers containing the heater unit and the catalysts, is discharged into the lower chamber 30 of the tubular housing 24 and flows therefrom through the outlet 34 to the apparatus with which the dissociator is employed.

In order to control the maximum temperature developed within the dissociation chamber, the end cap 86 is so adjusted on the rod 82 as to permit a predetermined expansion of the outer tubular member 14 corresponding to the temperature within the chamber above which it is undesirable to operate the apparatus. As the temperature approaches the maximum temperature desired, say about 2000° F., the outer tubular member 14 expands causing a predetermined movement of the rod 62 through the bushing 84 to contact the operating mechanism of the micro-switch 72. Under the pressure applied by reason of the expansion of the tubular member 14, the micro-switch 72 functions to interrupt the flow of current from the source of power (not shown) to the heating unit 36.

When the power delivered to the heating unit is interrupted, the temperature within the chambers 12 and 14 will gradually be reduced to such a temperature as will permit the contraction of the tubular member 14 and, consequently, the withdrawal of the end cap 86 from the operating mechanism of the micro-switch 72, thus closing the circuit between the power source and the heater unit and again permit heating of the heater unit. In this manner, a very close control of the maximum temperature developed within the chamber 14 is maintained, and damage to the apparatus by reason of excessive heating is prevented.

As explained hereinbefore, the apparatus is readily assembled, and where desired or necessary the heater unit 36 is easily removed from the assembly for replacement or repairs. Further, the heat generated within the apparatus is efficiently employed, since it is generated in close proximity to the flow of the ammonia gas, the greatest source of heat, therefore, being within the dissociating chambers themselves. This positioning of the heater unit 36 within the chambers conserves the power utilized necessitating ower power input than is used in the conventional type of dissociators.

In a specific embodiment of the apparatus of this invention and for the purpose of illustrating the practical application of the invention, the outer tubular member 14 is formed of a nickel-chromium-iron pipe of standard one-quarter inch size and having a length of six feet. With a unit employing an outer tubular member 14 of this length and operating at a maximum temperature of 1850° F. and at a flow of 32 cubic feet per hour, a 99.5% dissociation of the ammonia gas delivered to the apparatus is obtained, whereas at a temperature of 1950° F. and with the same flow rate, a dissociation of 99.95% of the ammonia is obtained. Larger units employing a pipe having a diameter of two inches as the outer tubular member 14 have a capacity of 500 cubic feet per hour with a corresponding high rate of dissociation.

The apparatus described hereinbefore is a small compact unit capable of a high volume rate of flow and utilizing a minimum of power input. The construction is simple, while the cost of construction and maintenance is very low. By way of example, the unit capable of handling 500 cubic feet per hour can be built for from onefourth to one-half the cost of the known dissociators of conventional design for the same capacity.

Although this invention has been described with reference to a particular embodiment, it is, of course, not to be limited thereto except insofar as is necessitated by the prior art and the scope of the appended claims.

I claim as my invention:

1. Apparatus for the dissociation of ammonia comprising in combination, a heating chamber disposed to receive ammonia delivered thereto, means disposed in the heating chamber for evolving heat of predetermined degree to effect a partial dissociation of ammonia as it flows therethrough, a second chamber disposed in spaced relation about a portion of the heating chamber and enclosing one end thereof, the heating chamber having an opening at the enclosed end within the second chamber to permit the heated ammonia to flow directly thereto, the second chamber being so disposed that the ammonia delivered thereto flows through the space between the chambers in the reverse direction to its flow in the heating chamber whereby heat radiated from the heating chamber will affect the ammonia, means comprising metal capable of functioning as a catalyst disposed in the second chamber for cooperating with the heat radiated from the heating chamber and carried by the ammonia to effect the completion of the dissociation of the ammonia as it flows therethrough, the metallic catalyst being so disposed as to provide a plurality of small paths for the flow of ammonia whereby a turbulent high velocity flow is obtained for effecting a physical contact of substantially all of the ammonia molecules with the catalyst, and means associated with the second chamber and responsive to a thermal expansion thereof for controlling the heating means to maintain the heat within the chamber at not over a predetermined degree.

2. Apparatus for the dissociation of ammonia comprising in combination, a plurality of elongated tubular members disposed concentrically and in spaced relation to each other to form inner and outer chambers, a heating unit disposed in the inner chamber for heating the chambers, an inlet in one end of the inner chamber for the ingress of ammonia to the inner chamber only, an outlet in the other end of the inner tubular member for the egress of the ammonia directly to the outer chamber, means comprising a metal capable of functioning as a catalyst disposed in the outer chamber for cooperating with the heat to effect the dissociation of ammonia as it flows therethrough, the metallic catalyst being so disposed as to provide a plurality of small paths for the flow of ammonia whereby a turbulent high velocity flow is obtained for effecting a physical contact of substantially all of the ammonia molecules with the catalyst, and means associated with the outer chamber and responsive to thermal expansion thereof for controlling the heating unit to maintain the heat of the chambers at not over a predetermined degree.

3. Apparatus for the dissociation of ammonia comprising in combination, a heating chamber disposed to receive ammonia delivered thereto, means disposed in the heating chamber for evolving heat of predetermined degree to effect a partial dissociation of ammonia as it flows therethrough, a second chamber disposed in spaced relation about a portion of the heating chamber to receive the partially dissociated ammonia as it flows from the heating chamber, the second chamber being heated by heat radiating from the heating chamber and by the heat of the partially dissociated ammonia flowing thereto, means comprising a plurality of catalyst bodies disposed in the second chamber for effecting the completion of the dissociation of the partially dissociated ammonia as it flows therethrough, the catalyst bodies being so disposed as to provide a plurality of small paths for the flow of the ammonia whereby a turbulent high velocity flow is obtained for effecting a physical contact of substantially all of the ammonia molecules with the catalyst, a micro-switch associated with the outer chamber and the heating means, and means comprising a rod integrally united to the outer chamber and disposed to control the operation of the micro-switch in response to the thermal expansion of the chamber for controlling the heat evolved from the heating means to maintain the temperature within the chamber at not over a predetermined amount.

4. In an apparatus for the dissociation of ammonia, in combination, a plurality of elongated tubular members disposed concentrically and in spaced relation to each other to form inner and outer chambers, the inner tubular member projecting outwardly from the outer member at one end thereof, a tubular housing disposed about one end of the outer member to project outwardly therefrom beyond the projecting end of the inner tubular member, a barrier disposed about the inner tubular member and projecting outwardly therefrom to the tubular housing to divide the housing into two compartments sealed from each other, a removable plate associated with the end of the housing for closing it, a heating unit disposed in the inner chamber for evolving heat and adapted to be removed therefrom upon removal of the removable plate from the housing, an inlet in one of the compartments for the ingress of ammonia to the inner chamber only whereby the ammonia flows through the chamber in close proximity to the heating unit, an outlet in the other end of the inner member for the egress of the heated ammonia directly to the outer chamber, means comprising a metal catalyst disposed in the other chamber for cooperating with the heat to effect the dissociation of the ammonia as it flows therethrough, the catalyst being so disposed as to provide a plurality of small paths for the flow of ammonia whereby a turbulent high velocity flow is obtained for effecting a physical contact of substantially all of the ammonia molecules with the catalyst, the outer tubular member discharging the dissociated ammonia directly into the second of the compartments formed in the housing, an outlet in the second compartment for the egress of the dissociated ammonia therefrom, and means associated with the outer chamber and responsive to thermal expansion thereof for controlling the heat evolved from the heating unit to maintain the temperature within the chamber at not over a predetermined amount.

5. In an apparatus for the dissociation of ammonia having a path formed by two elongated tubular members disposed concentrically and in spaced relation to each other to form inner and outer chambers having side walls for the flow of ammonia which is to be dissociated, in combination, a heating unit disposed in the inner chamber, means covering the heating unit to protect it from the ammonia, said heating unit and protective covering therefore filling the major part of the inner chamber whereby a high velocity flow of ammonia through the inner chamber is obtained while being heated, a metal catalyst so disposed in the space between the concentric side walls of the inner and outer chambers as to substantially fill it while providing a plurality of small paths therethrough for the flow of ammonia whereby a turbulent high velocity flow is obtained for effecting a physical contact of substantially all of the ammonia molecules with the catalyst to effect a substantially complete dissociation of the ammonia, and means associated with the outer chamber and responsive to a thermal expansion thereof for controlling the temperature of the heating unit to maintain the temperature within the chamber at not over a predetermined amount.

JOHN R. GIER, Jr.